T. D. ADAIR.
SPEEDOMETER.
APPLICATION FILED JAN. 4, 1915.
1,161,757.
Patented Nov. 23, 1915.
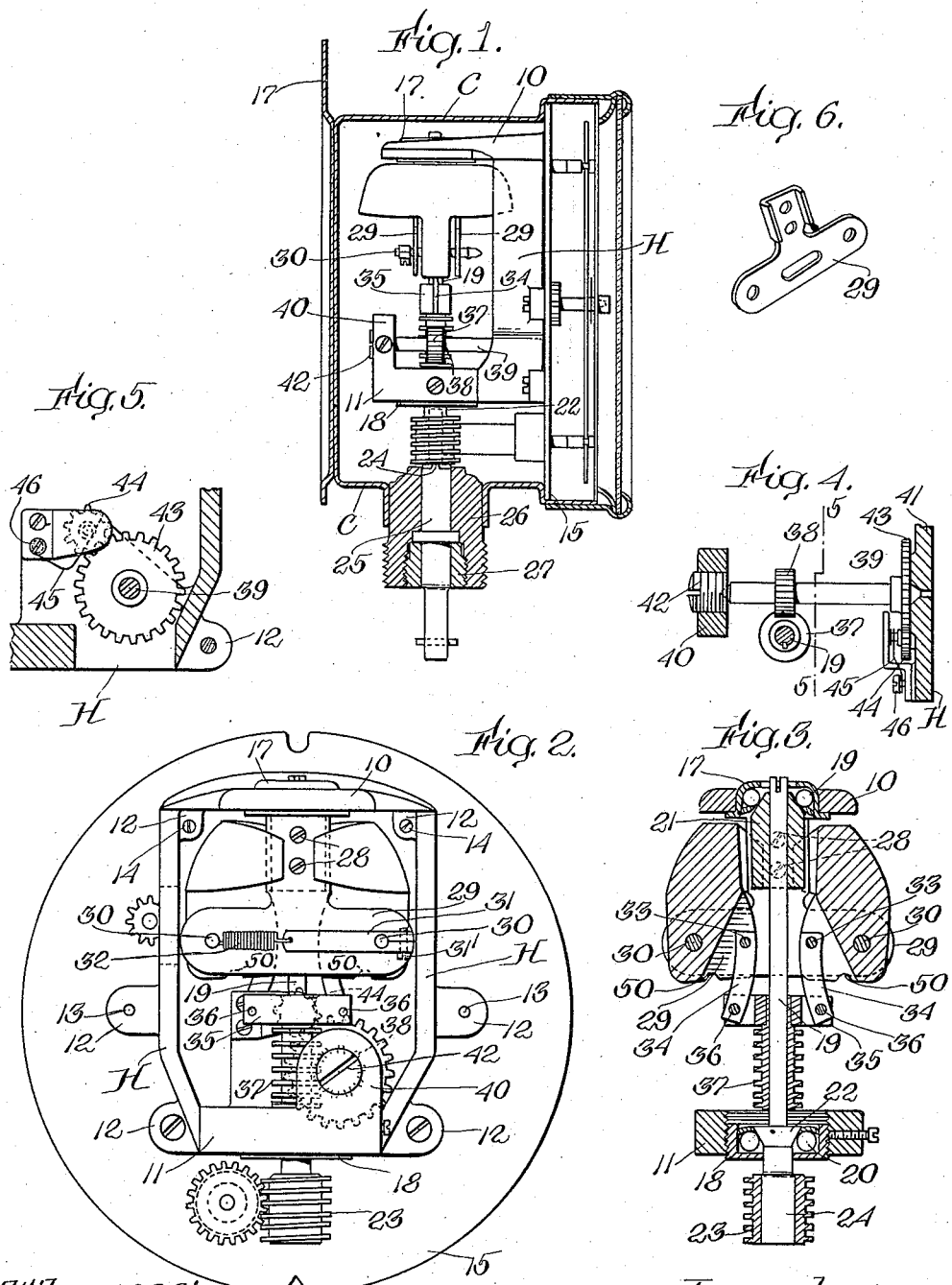

UNITED STATES PATENT OFFICE.

THOMAS DONALD ADAIR, OF BOSTON, MASSACHUSETTS, ASSIGNOR TO STANDARD THERMOMETER COMPANY, OF PORTLAND, MAINE, A CORPORATION OF MAINE.

SPEEDOMETER.

1,161,757.      Specification of Letters Patent.      Patented Nov. 23, 1915.

Application filed January 4, 1915. Serial No. 384.

*To all whom it may concern:*

Be it known that I, THOMAS DONALD ADAIR, a citizen of the United States, residing at Dorchester, Boston, in the county of Suffolk and State of Massachusetts, have invented certain new and useful Improvements in Speedometers; and I do hereby declare the following to be a full, clear, and exact description of the invention, such as will enable others skilled in the art to which it appertains to make and use the same.

The present invention relates to speedometers, and has for its object the reorganization and improvement of the structure constituting the speed responsive mechanism, whereby devices of this type may be made more simple and, therefore, more durable, and by reason of greater simplicity in construction be manufactured at a greatly reduced cost. This object is accomplished at no sacrifice of sensitiveness hitherto attained, the speedometer responding immediately to variations of speed and indicating them accurately; and upon the cessation of locomotion of the vehicle whose speed is indicated, the indicator needle returns instantly to zero, a highly desirable feature in this kind of instrument, and long made the object of attainment.

To this end, the invention consists in the device hereinafter described and particularly defined in the claims.

In the accompanying drawing illustrating the preferred form of the invention, Figure 1 is a side central sectional view of the speedometer casing showing the speedometer in side elevation; Fig. 2 is a plan of the speedometer, looking from left to right on Fig. 1; Fig. 3 is a longitudinal central sectional view of the speed responsive mechanism; Fig. 4 is a detail of the speed indicating device gears; Fig. 5 is a sectional view on line 5—5 of Fig. 4, looking from left to right; and Fig. 6 is a detail of the governor weight support.

The speedometer is composed of two parts, the one a speed responsive mechanism and the other a speed indicating device, both being housed in a frame work or housing, indicated in a general way by the reference character H. The housing consists of two main shaft bearing plates 10 and 11 rigidly connected by two side ribs or binders from which project outwardly and inwardly extending ears 12 through which pass pins 13 and screws 14 for the purpose of positioning and securing the housing to an odometer plate 15 upon which are supported the mileage indicating gears. This plate 15, together with the speedometer mechanism, is received into the casing C and is positioned therein upon the shoulder 16 of the casing, formed by contracting the diameter of the upper or dial portion of the casing. The base of the casing is provided with a flange 17 by which the speedometer is secured on the vehicle or other means of locomotion whose speed it is desired to ascertain.

The bearing plates 10 and 11 are provided near their free ends with hardened steel bushings which constitute raceways for ball-bearings; the bushing 17 is permanently secured into the plate 10, whereas the bushing 18 screws into the plate 11, thereby affording means for adjusting the end play of the main shaft 19 of the speedometer, which is mounted between the ball-bearings 19 and 20 and supported in that position by means of hardened steel sleeves 21 and 22 rigidly fixed to the shaft, each of the sleeves presenting a sharply-beveled ball-bearing surface to the ball-bearings. The sleeve 22 supports on its outer or lower end an odometer actuating screw 23 which by means of suitable connections actuates an odometer used with the speedometer, but forming no part of the present invention. The lower end of the sleeve is slotted at 24 to receive the inner end of a speedometer actuating or transmission key 25 which is mounted in the lug 26 made integral with the casing C. The transmission key is maintained in place in the lug 26 by the bushing 27. The outer or disengaged end of the transmission key 25 is adapted to be engaged by a flexible shaft in connection with some rotating part, of which the speed is measured.

The sleeve 21, with the exception of the beveled ball-bearing surface portion, is machined square and serves as a governor weight support block. Secured to the front and rear faces of the block by means of the screws 28 and depending therefrom are two T-shaped governor weight supports or brackets 29. To prevent lateral movement of the weight brackets, the lateral extensions of the foot of each bracket, the foot being that part of the bracket which is in contact with the support block, are bent backward so as to clasp snugly each side of the block adjacent to the faces to which the brackets are secured. These governor weight supporting brackets afford a rigid mounting for the governor weights, which are interpositioned between them, the brackets being properly spaced for that purpose by the support block. The governor weights are pivotally supported in position between the brackets by means of the fulcrum pins 30 made fast in the lower ends of the weights, the ends of the pins protruding from each side of the lower ends of the governor weights being journaled in the ends of the cross-bars of the brackets, and projecting laterally from each side thereof sufficiently for receiving thereon the spring arms 31 and springs 32. The pin embracing end of the spring arm is slotted and is clamped together by means of the screw 31¹, thus affording means whereby, in conjunction with the spring 32, the counteracting force necessary to be exerted upon the governor weights may be easily adjusted. The fulcrum pin journal bearings of the one bracket are each respectively diametrically opposite to the corresponding bearings in the other bracket, and are all equally distanced from the axis of the main shaft 19, so that the individual axes upon which the governor weights perform an outward rotary movement when acted upon by centrifugal force while they simultaneously revolve about their common axis, lies at an equal distance from that common axis, thus assuring the maintenance of a perfect equilibrium between the weights.

Attention is directed particularly to the shape of the governor weights and to the mechanism for communicating their outward axial movement to the speed indicating device. The governor weights in front and rear elevation are T-shaped; the head or cross-bar portions are of arcuate or crescent form and have the inner surfaces recessed conformably to the shape of the support block, so as to allow the weights when they are at rest or are revolving at a low speed to nearly encircle the block, as shown in Fig. 2.

The means by which the centrifugal movement of the governor weights is communicated to the speed indicating device is described as follows: Pivotally connected with the governor weights by means of the pins 33 fastened in the lower end of the weights and near their inner faces, and depending therefrom are two connecting links 34, whose lower ends are received in the slotted ends of the cross-head 35 and are pivotally connected with the cross-head by means of the pins 36. The cross-head is rigidly positioned upon a hub extending from a parallely grooved or toothed sleeve 37, mounted upon the main shaft and longitudinally movable thereon. Meshing with the toothed sleeve 37 is an indicator device actuating gear 38, fixed upon the indicator device arbor 39. The arbor 39 is mounted between two indicator arbor bearing plates 40 and 41 extending at right angles to the main shaft bearing plate 11. The plate 40 receives a set-screw 42 in the inner end of which one end of the arbor 39 finds a bearing, the set-screw affording means for adjusting the end-play of the arbor. Upon the opposite end of the arbor from the gear 38 is another gear 43 which meshes with an indicator gear 44 upon whose shaft the indicator needle is fixed. The free end of a damping spring 45 secured at one end under the head of the screw 46 bears against the hub of the indicator gear 44 and prevents vibration of the indicator needle by reason of backlash or otherwise.

The outward throw of the governor weights is determined by the amount of space between the bottoms of the governor weights and the top of the cross-head 35. As indicated in Fig. 3 the bottoms of the governor weights have notches 50 which are engaged by the upper corners of the cross-head 35 and serve to prevent the further inward movement of the lower ends of the governor weights.

The mode of operation of the above-described speed indicating instrument is described as follows: A rotary movement being communicated by a flexible shaft to the main shaft 19 by means of the transmission key 25, the support block 21 together with its adjacent parts, the weight brackets and the governor weights, is revolved axially with the main shaft; and the cross-head 35 with its supporting sleeve 37, they being articulated to the governor weights by means of the connecting links 34, is also revolved axially with the main shaft. As the speed of rotation of the shaft increases, the centrifugal force exerted on the governor weights moves them outward against the restoring force of the springs 32. As the weights move outward, they act through the links 34 to raise the cross-head 35 and the toothed sleeve 37. The upward movement of the toothed sleeve 37 rotates the indicating device actuating gear 38 which serves to turn the indicating hand on the dial face and to thus indicate the speed of the vehicle.

It will be noted that the shape of each governor weight is such that when the weights are in the position shown in Fig. 3 or when very little centrifugal force is applied, the point at which the mass of the governor weight may be considered to be concentrated in so far as the turning moment about the fulcrum pin 30 due to centrifugal force is concerned, is nearer to the axis of the main shaft 19 than the fulcrum pin 30. Consequently, the lever arm of a governor weight is inclined upwardly and inwardly from the axis of the fulcrum pin 30. When the parts have the position shown in Fig. 3 and no centrifugal force is acting, the pins 33 which connect the governor weights with the links 34 are positioned directly inside of the fulcrum pin 30 and in the same horizontal plane. Consequently the lever arm between the pins 30 and 33 is inclined at less than a right angle to the lever arm from the pins 30 to the point at which the centrifugal force may be considered to be applied to the governor weight, the governor weight forming a bell crank lever the arms of which are separated by less than a right angle. It will be noted that the pins 33 are positioned nearer the axis of the main shaft than the pins 36 which connect the links 34 with the cross-head 35 as a consequence of which the links, when in the position shown in Fig. 3 are upwardly and inwardly inclined.

As the governor weights turn, the links 34 tend to become vertical. It will also be noted that as the governor weights turn, the pins 33 travel not only upward but outward in an arc about the fulcrum pins 30 so that for equal increments of rotation of the governor weights about the fulcrum pins 30, the increments in vertical movement given to the pins 33 become relatively smaller as the governor weights move outward. When the parts are in the position shown in Fig. 3, when no centrifugal force is acting, the spring arms 31 and springs 32 lie in horizontal lines extending directly between the fulcrum pins 30. As the governor weights move outward the extension of the springs and the effective lengths of the lever arms increase, not as a linear function of the turning movement of the governor weights, but faster, so that for equal increments in the rotation of the governor weights, greater increments are incurred in the restoring moments due to the springs. The parts of the governor weights are so designed with relation to the various leverages that for equal increments in the upward movement of the main shaft 19, equal increments in the upward movement of the toothed sleeve 37 take place. Consequently the movement of the speed indicator needle has a linear relation to the speed of the vehicle and the dial over which the needle moves may be graduated in equal divisions at all parts of the scale.

The mechanism herein described is very cheap to manufacture. The speed indicating mechanism and the speed indicating device are both mounted in the casting which forms the housing for them independent of the speedometer casing. The necessary machining for the bearings of the various rotating parts may be done in one series of operations without removing the casting from the jig within which the casting is placed in machining. The governor weights are cast and require but little finishing. The connecting links are died out as are also the weight brackets. The cross-head is made from square rolled brass, jig machined, and pressed on to the hub of the toothed sleeve which is machined in a turret lathe.

While the preferred embodiment has been specifically illustrated and described it is to be understood that the invention is not limited to the illustrated embodiment but may be embodied in other constructions within the scope of the invention set forth in the following claims.

I claim—

1. A speedometer, having, in combination, a shaft, an indicating device, a toothed sleeve longitudinally movable on the shaft and operatively connected with the indicating device and a speed responsive mechanism consisting of a block fixed rigidly on the shaft, weight brackets secured to the block, governor weights mounted on the brackets, connections between the governor weights and the toothed sleeve, whereby when the weights are moved the sleeve is moved, said governor weights being generally crescent-shaped with a depending portion so that they are T-shaped in front and rear elevation.

2. A speedometer, having, in combination, a shaft, a fixed weight support block on the shaft, weight brackets depending from the block, governor weights pivotally mounted on the weight brackets, links pivoted to the weights, a cross-head for receiving the other ends of the links, and a toothed sleeve mounted on the cross-head and movable longitudinally on the shaft, and adapted to move longitudinally along the shaft when the weights swing.

3. A speedometer, having, in combination, a shaft, a weight support block fixedly positioned on the shaft, weight brackets depending from the block, governor weights mounted on the brackets, links pivoted at one end to the weights, a cross-head for receiving the other end of the links, a toothed sleeve mounted on the cross-head, and an indicating device actuated by the toothed sleeve, the toothed sleeve being adapted to be moved when the weights are moved under centrifugal force.

4. A speedometer, having, in combination, a shaft, a weight support block fixedly mounted on the shaft, weight supports secured to the block, governor weights pivotally mounted on the supports, connecting links mounted on the weights, a cross-head to receive the other ends of the links, a toothed sleeve secured to the cross-head and embracing the shaft and movable thereon relatively to the weight support block, the toothed sleeve being adapted to move longitudinally when the weight arms are moved axially, an indicating device operatively connected with the toothed sleeve, including an indicator pinion having a hub and a damping spring for engaging the pinion hub.

5. A speedometer, having, in combination, a speed responsive mechanism, a speed indicating device, connections between the two whereby the indicating device is caused to operate when the responsive mechanism operates, and an integral housing for the speed responsive mechanism and the speed indicating device, consisting of two main shaft bearing plates rigidly connected by ribs, and two indicating arbor plates extending at right angles from one of the main shaft bearing plates.

6. A speedometer, having, in combination, a speed indicating device, and a speed responsive mechanism, connections between them whereby when the responsive mechanism operates, the indicating device operates, the speed responsive mechanism consisting of a shaft, a support block rigidly positioned on the shaft, weight brackets secured to the block, and two generally crescent-shaped governor weights with a depending portion so that they are T-shaped in rear and front elevation, the indicating device including a toothed sleeve and a crosshead rigidly positioned thereon.

THOMAS DONALD ADAIR.

Witnesses:
LOUISE J. CARR,
BESSIE J. SMITH.

Copies of this patent may be obtained for five cents each, by addressing the "Commissioner of Patents, Washington, D. C."